(12) United States Patent
Jiang et al.

(10) Patent No.: US 11,181,874 B2
(45) Date of Patent: Nov. 23, 2021

(54) N-1 STATIC SECURITY ANALYSIS METHOD FOR INTEGRATED ENERGY SYSTEM

(71) Applicant: NORTHEAST ELECTRIC POWER UNIVERSITY, Jilin (CN)

(72) Inventors: Tao Jiang, Jilin (CN); Houhe Chen, Jilin (CN); Xue Li, Jilin (CN); Junyan Shao, Jilin (CN); Guoqing Li, Jilin (CN); Rufeng Zhang, Jilin (CN); Benxin Li, Jilin (CN); Changjiang Wang, Jilin (CN); Song Zhang, Jilin (CN); Shuguang Li, Jilin (CN); Xiaohui Li, Jilin (CN)

(73) Assignee: NORTHEAST ELECTRIC POWER UNIVERSITY, Jilin (CN)

( * ) Notice: Subject to any disclaimer, the term of this patent is extended or adjusted under 35 U.S.C. 154(b) by 0 days.

(21) Appl. No.: 16/977,009

(22) PCT Filed: Dec. 20, 2018

(86) PCT No.: PCT/CN2018/122273
§ 371 (c)(1),
(2) Date: Aug. 31, 2020

(87) PCT Pub. No.: WO2020/062633
PCT Pub. Date: Apr. 2, 2020

(65) Prior Publication Data
US 2021/0216055 A1    Jul. 15, 2021

(30) Foreign Application Priority Data
Sep. 30, 2018   (CN) .......................... 201811155442.8

(51) Int. Cl.
*G05B 17/02*   (2006.01)
*G06Q 10/06*   (2012.01)
*G06Q 50/06*   (2012.01)

(52) U.S. Cl.
CPC .................................... *G05B 17/02* (2013.01)

(58) Field of Classification Search
CPC ..... G05B 17/02; Y02P 90/82; G06Q 10/0635; G06Q 10/0639; G06Q 50/06
See application file for complete search history.

(56) References Cited

FOREIGN PATENT DOCUMENTS

| CN | 103473713 A | * 12/2013 |
| CN | 105958480 A | 9/2016 |

(Continued)

OTHER PUBLICATIONS

International Search Report of PCT/CN2018/122273.
Written Opinion of PCT/CN2018/122273.

*Primary Examiner* — Chad G Erdman
(74) *Attorney, Agent, or Firm* — Dragon Sun Law Firm, PC; Jinggao Li, Esq.

(57) ABSTRACT

The present invention discloses an N-1 static security analysis method for integrated energy system, including the following steps: constructing a static model of the IES including electro-gas-thermal coupling elements, calculating multiple energy flow equations, and calculating the multiple energy flow of the IES to obtain an operating status of the IES; constructing a N-1 preconceived accident set, calculating multiple energy flow of the IES, and performing security verification to the status of the coupling elements in each preconceived accident set, respectively; analyzing the security verification results by comparing the results of static security analysis under different control modes, so that an N-1 static security analysis is achieved. The present invention fully researches the security of the IES, comprehensively considers the influence of the output changes of the coupling elements on the operating point of the energy system, and evaluates the security and stability of the IES.

8 Claims, 5 Drawing Sheets

(56) References Cited

FOREIGN PATENT DOCUMENTS

| | | | |
|---|---|---|---|
| CN | 106067677 A | * | 11/2016 |
| CN | 106067677 A | | 11/2016 |
| CN | 108565863 A | | 9/2018 |
| CN | 108875277 A | * | 11/2018 |
| EP | 2990726 A1 | | 3/2016 |

* cited by examiner

N-1 STATIC SECURITY ANALYSIS METHOD FOR INTEGRATED ENERGY SYSTEM

CROSS-REFERENCE TO RELATED APPLICATIONS

This application is a bypass continuation application of PCT Application No. PCT/CN2018/122273. This application claims priority from PCT Application No. PCT/CN2018/122273, filed Dec. 20, 2018 CN Application No. CN 201811155442.8 filed Sep. 30, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present invention relates to the technical field of integrated energy system, and in particular to an N-1 static security analysis method for integrated energy system (hereinafter referred as IES).

BACKGROUND OF THE PRESENT INVENTION

In the background of the Global Energy Internet, multiple energy sources, such as electricity, gas and heat, are becoming more and more closely combined. With the continuous addition of coupling equipment, the traditional independent state of each energy subsystems has been broken to form an integrated energy system (IES). The multi-energy flow cooperative operation brings new challenges to the security operation of the IES while improving economic benefits. The energy interconnection among subsystems in the IES is frequent and the coupling relationship is complex. Therefore, it is necessary to perform re-modeling method and security analysis so as to ensure the secure and stable operation. The traditional analysis method of single energy subsystem is no longer applicable to the complex static interaction coupling mechanism among subsystems, and it is necessary to carry out a comprehensive energy system security analysis method based on the existing Energy Internet analysis. Due to the IES model covers a plurality of subsystem physical models and coupling element models, the security problems of the IES is more complicated than the traditional energy subsystems. Therefore, it is essential to explore the complex coupling mechanism among subsystems in order to ensure security operation of the IES.

Modeling research of traditional energy sources, such as electricity, gas and heat, is relatively mature, but the research on modeling and security analysis of energy among the IES is still in a startup stage. The static security analysis of electricity, gas, and heat interconnection systems is a comprehensive energy research on the stability of the IES, and the development of the IES in China is slow. The operation of existing IES must rely on its static security, and planning and the following optimized operation are also based on the static security, the key of the IES operation is coupling elements which act as an energy conversion equipment. On the one hand, the coupling elements enable multiple energy flow subsystems to be interconnected; on the other hand, the security analysis of the system becomes more complicated. When the coupling elements change the output, the affected range and the extent of the impact are largely different, which is the focus of the IES security analysis.

Therefore, a heretofore unaddressed need exists in the art to address the aforementioned deficiencies and inadequacies

SUMMARY OF THE PRESENT INVENTION

The present invention provides an N-1 static security analysis method for integrated energy system. The present invention constructs an IES model coupling electro-gas-thermal energy sources, which calculates the multiple energy flow equations to obtain the operating status of the IES. Furthermore, the present invention performs N-1 security verification to the coupling elements of the IES under different operating conditions, and determines the operating status of the IES so as to analyze the security of the IES. The detailed description will be given hereinafter.

An N-1 static security analysis method for integrated energy system, including the following steps of:

constructing a static model of the IES including electro-gas-thermal coupling elements, calculating multiple energy flow equations, and calculating the multiple energy flow of the IES according to the decoupling algorithm, so that an operating status of the IES is obtained;

constructing a preconceived accident set based on the obtained operating status of the IES, calculating multiple energy flow of the IES in the preconceived accident set, and performing security verification to the status of the coupling elements in each preconceived accident set, respectively;

analyzing the security verification results by comparing them under different control modes, so that an N-1 static security analysis of the IES is achieved.

Preferably, mathematical model of the coupling elements in the static modeling of the IES includes a combined heat and power unit (hereinafter referred to as CHP) mathematical model, power to gas (hereinafter referred to as P2G) model, gas boiler model and gas turbine model.

Wherein, the P2G model is as follows:

$$G_{P2G,m} = \frac{\beta \cdot P_{P2G,n}}{H_g}$$

$$0 \leq P_{P2G,n} \leq P_{N,P2G}$$

Where $G_{P2G,m}$ is the natural gas consumption value at node m of the natural gas system; $H_g$ is the natural gas high calorific value; $P_{P2G,n}$ is the power consumed by P2G at node n of the electric power system, $\beta$ is the efficiency of the P2G, $P_{N,P2G}$ is the rated efficiency of the P2G.

Wherein, the gas boiler model is as follows:

$$P_{MT,r} = \alpha \cdot H_g \cdot l_{MT,l}$$

$$0 \leq P_{MT,r} \leq P_{N,MT}$$

Where $l_{MT,l}$ is the natural gas consumption value at node l of the natural gas system; $P_{MT,r}$ is the thermal power input at node r of the thermal system, $\alpha$ is the efficiency of the gas boiler; $H_g$ is the natural gas high calorific value; $P_{N,MT}$ is the rated efficiency of the gas boiler.

Wherein, the gas turbine model is as follows:

$$P_{GD,t} = \gamma \cdot H_g \cdot l_{GD,u}$$

$$0 \leq P_{GD,u} \leq P_{N,GD}$$

Where $l_{GD,u}$ is the natural gas consumption value at node u of the natural gas system; $P_{GD,t}$ is the power input at node t of the electric power system, $\gamma$ is the efficiency of the gas turbine; $H_g$ is the natural gas high calorific value; $P_{N,GD}$ is the rated efficiency of the gas turbine.

Preferably, the step of "constructing a preconceived accident set based on the obtained operating status of the IES" includes: Selecting the coupling elements as the key point of the IES, expanding the preconceived accident set around the coupling elements.

Preferably, the step of "performing security verification to the status of the coupling elements in each preconceived accident set, respectively" includes: performing N-1 verification to the IES under different operating conditions, obtaining the current operating status of the IES, determining whether the coupling elements in the IES are out of limits, and determining the type of the operating status.

Wherein, the step of "determining whether the coupling elements in the IES are out of limits" includes:
determining whether the following values are out of limits: branch power flow and node voltage of electric power system, fluid flow of the thermal system, node pressure and pipeline flow of the natural gas system.

The present invention has the following beneficial effects:
1. The present invention fully researches the security of the IES, comprehensively considers the influence of the output changes of the coupling elements on the operating point of the energy system, and evaluates the security and stability of the IES;
2. The present invention provides a control basis for dispatchers. When the energy system is in an unsafe status, the present invention reduces the influence scope of unsafe factors by adjusting the control mode of the coupling elements in the IES.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Wherein, FIG. 3(a) is a pipeline flow out-of-limit diagram of the heat-supply network after the CHP is quit operation;

FIG. 3(b) is a voltage out-of-limit diagram of the grid after the CHP is quit operation; and FIG. 3(c) is a power flow out-of-limit diagram of the grid branch after the CHP is quit operation;

Wherein, FIG. 4(a) is a flow diagram of the heat-supply network after the gas boiler is quit operation;

FIG. 4(b) is a node pressure out-of-limit diagram of the gas network after the P2G is quit operation; and FIG. 4(c) is a branch power flow out-of-limit diagram of the gas network after the P2G is quit operation;

Wherein, FIG. 5(a) is an efficiency diagram of the CHP1; FIG. 5(b) is an efficiency diagram of the CHP2; FIG. 5(c) is an efficiency diagram of the gas boiler; FIG. 5(d) is an efficiency diagram of the P2G; and FIG. 5(e) is an efficiency diagram of the gas turbine.

Figure 1:
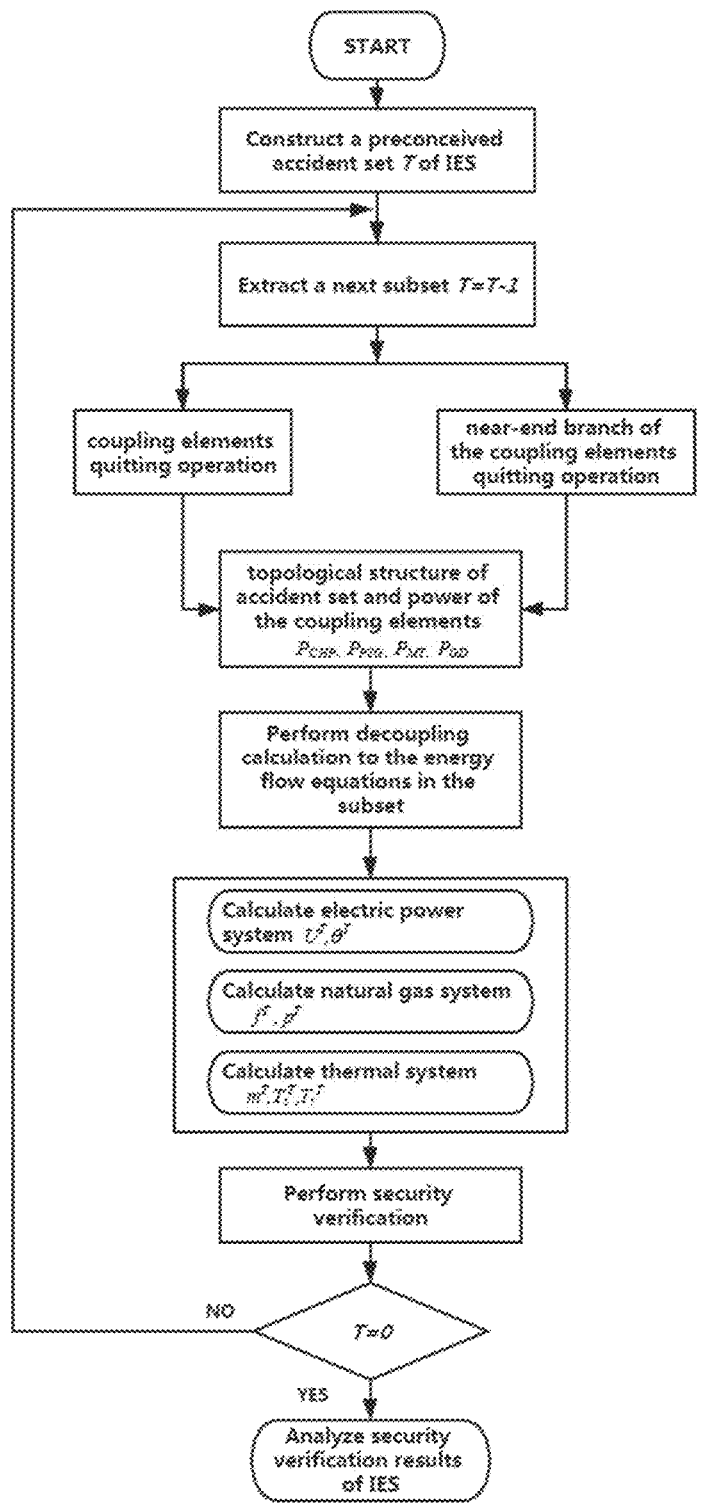
FIG. 1 is a flow diagram of the static security analysis method of the IES according to the present invention.

Tab 1 is a diagram showing the security verification result after the near-end branch of the CHP is quit operation; and Tab 2 is a diagram showing the security verification result after the near-end branch of the gas boiler is quit operation.

DETAILED DESCRIPTION OF EMBODIMENTS

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

To make the objectives, technical solutions and advantages of the present invention clearer, the implementations of the present invention will be further described below in detail.

Embodiment 1

This embodiment of the present invention provides an N-1 static security analysis method for the integrated energy system. As shown in FIG. 1, the method of the present invention includes the following steps of:

Step 101: constructing a static model of the IES including electro-gas-thermal coupling elements (the static model therein refers to energy flow equations of nodes and branches in the IES), calculating multiple energy flow equations, and calculating the multiple energy flow of the IES according to the decoupling algorithm, so that an operating status of the IES is obtained;

wherein, the operating status comprises values of the electric power system in the IES, such as voltage, phase angle, power, etc., values of the pipeline of the thermal system, such as flow amount, node temperature, etc., and values of the natural gas system, such as node pressure, gas flow, etc.

Step 102: constructing a preconceived accident set based on the obtained operating status of the IES, calculating multiple energy flow of the IES in the preconceived accident set, and performing security verification to the status of the coupling elements in each preconceived accident set, respectively;

Step 103: analyzing the security verification results obtained in the Step 102, comparing the static security analysis results under different control modes to achieve an N-1 static security analysis.

Therefore, by the steps 101 to 103, the embodiment of the present invention fully analyzes the security of the IES, comprehensively considers the influence of the output changes of the coupling elements on the operating point of the energy system, and evaluates the security and stability of the IES.

Embodiment 2

The technical solution of Embodiment 1 is further described below with reference to FIG. 1 and the following equations, which is described in detail as follows:

Step 1: constructing a static model of the IES including electro-gas-thermal coupling elements, including:
constructing the electric power system, the thermal system, natural gas system, and the coupling elements models, respectively; calculating the multiple energy flow of the IES according to the decoupling algorithm to obtain an operating status of the IES, that is to obtain the power of each coupling element and values characterizing the status of the coupling elements, such as voltage, pressure temperature, etc.

Step 1-1: a mathematical model of the electric power system is constructed, the mathematical model adopts a traditional power system AC model, and each node mainly includes four state values, which are: an active power, a reactive power, a voltage amplitude, and a voltage phase angle, and the relations among the four are as follows:

$$P_i = U_i \sum_{j=1}^{n} U_j (G_{ij}\cos\delta_{ij} + B_{ij}\sin\delta_{ij}) \tag{1}$$

$$Q_i = U_i \sum_{j=1}^{n} U_j (G_{ij}\sin\delta_{ij} - B_{ij}\cos\delta_{ij}) \tag{2}$$

Where $P_i$, $Q_i$ represent an active power and a reactive power of a node i, respectively; $G_{ij}$, $B_{ij}$ represent conductance and susceptance between the node i and a node j of the electric power system, respectively; $U_i$, $U_j$ represent voltage amplitude of the node i and the node j, respectively; $\delta_{ij}$ represents the phase angle difference between the node i and a node j.

Step 1-2: a mathematical model of the natural gas system is constructed, the mathematical model adopts Weymouth model, the status amount of the natural gas nodes are mainly characterized by flow amount and node pressure; natural gas also includes a compressor, and the model is as follows:

$$f_{ij} = \text{sgn}_{ij} \cdot k_{ij} \cdot \sqrt{\text{sgn}_{ij}(p_i^2 - p_j^2)} \tag{3}$$

$$\text{sgn}_{ij} = \begin{cases} +1 & p_i \geq p_j \\ -1 & p_i < p_j \end{cases}$$

$$f_{cp} = \frac{k_{cp} f_{com} T_{gas}}{q_{gas}} \left( k_{cp}^{\frac{a-1}{a}} - 1 \right) \tag{4}$$

Where $f_{ij}$ is the pipeline natural gas flow amount; $k_{ij}$ is the pipeline constant; $p_i$, $p_j$ are pressure of the node i and the node j, respectively; $\text{sgn}_{ij}$ is a symbolic function, which represents the natural gas transmission direction in the pipeline; $f_{fp}$ is the flow amount consumed by the compressor; $k_{cp}$ is the pipeline constant of the branches in the compressor; $f_{com}$ is the natural gas flow amount consumed by the compressor; $T_{gas}$ is the natural gas temperature; $q_{gas}$ is the natural gas heat value; and a is a polytropic index.

Step 1-3: a mathematical model of the thermal system is constructed, the mathematical model adopts static thermal system model, mainly including hydraulic model and thermal model:

(1) Hydraulic Model $$A_h \dot{m} = m_q \tag{5}$$

$$B h_f = BKm|\dot{m}| = 0 \tag{6}$$

Where $A_h$ is a node-branch correlation matrix of the thermal system; m is a flow amount of the pipeline thermal fluid; $m_q$ is a flow amount of the thermal fluid flowed out of individual node; B is a loop-branch correlation matrix of the thermal system; K is a resistance coefficient matrix of the pipeline; and $h_f$ is the head loss.

(2) Thermal Model $$\phi = C_p m_q (T_s - T_o) \tag{7}$$

$$T_{end} = (T_{start} - T_a)e^{\frac{-\lambda L}{c_p m}} + T_a \tag{8}$$

$$\left(\sum \dot{m}_{out}\right) T_{out} = \sum \dot{m}_{in} T_{in} \tag{9}$$

Where $C_p$ is the specific heat capacity of fluid; $T_s$ is the temperature of the thermal fluid before flowing into the load; $T_o$ is the temperature of the thermal fluid when flowing out of the load; $\varphi$ is the node load; $T_{end}$ is the temperature of the thermal fluid at the tail end of the pipeline; $T_{start}$ is the temperature of the thermal fluid at the head end of the pipeline; $T_a$ is the ambient temperature; $\lambda$ is the coefficient of the thermal conductivity of the pipeline; L is the length of the pipeline; $\dot{m}_{out}$ is the flow amount when fluid flowing out of the node; $T_{out}$ is the temperature when fluid flowing out of the node;

Step 1-4: a mathematical model of the coupling elements is constructed as follows:

1) A Mathematical Model of the CHP $$P_{CHP} = P_{CHP,e} + P_{CHP,h} \tag{10}$$

$$c_{eh} = \frac{P_{CHP,h}}{P_{CHP,e}} \tag{11}$$

$$P_{CHP,min} \leq P_{CHP} \leq P_{CHP,max} \tag{12}$$

Where $P_{CHP}$ is the total power of the CHP; $P_{CHP,e}$ is the electric power from the CHP; $P_{CHP,h}$ is the thermal power from the CHP; $C_{eh}$ is the electric heating ratio; and $P_{CHP,min}$, $P_{CHP,max}$ are the minimum and maximum power of the CHP, respectively.

2) a Mathematical Model of the P2G $$G_{P2G,m} = \frac{\beta \cdot P_{P2G,n}}{H_g} \tag{13}$$

$$0 \leq P_{P2G,n} \leq P_{N,P2G} \tag{14}$$

Where $G_{P2G,m}$ is the natural gas consumption value at the node m of the natural gas system; $H_g$ is the natural gas high calorific value; $P_{P2G,n}$ is the power consumed by P2G at node n of the electric power system, $\beta$ is the efficiency of the P2G, $P_{N,P2G}$ is the rated efficiency of the P2G.

3) A Mathematical Model of the Gas Boiler $$P_{MT,r} \alpha \cdot H_g \cdot l_{MT,l} \tag{15}$$

$$0 \leq P_{MT,r} \leq P_{N,MT} \tag{16}$$

Where $l_{MT,l}$ is the natural gas consumption value at node l of the natural gas system; $P_{MT,r}$ is the thermal power input at node r of the thermal system, $\alpha$ is the efficiency of the gas boiler; $H_g$ is the natural gas high calorific value; $P_{N,MT}$ is the rated efficiency of the gas boiler.

4) A Mathematical Model of the Gas Turbine $$P_{GD,t} = \gamma \cdot H_g \cdot l_{GD,u} \quad (17)$$

$$0 \leq P_{GD,u} \leq P_{N,GD} \quad (18)$$

Where $l_{GD,u}$ is the natural gas consumption value at node u of the natural gas system; $P_{GD,t}$ is the power input at node t of the electric power system, $\gamma$ is the efficiency of the gas turbine; $H_g$ is the natural gas high calorific value; $P_{N,GD}$ is the rated efficiency of the gas turbine.

Step 2: constructing a preconceived accident set of the IES and performing N-1 security verification: wherein the steps of N-1 security verification mainly comprises the following two steps:

The first step is constructing a preconceived accident set: the preconceived accident set is selected based on the key point of the IES, the coupling elements in the IES as the energy conversion element plays an important role in the connection between the sub-networks. Therefore, the coupling elements are selected as the key point of the IES, and the preconceived accident set is expanded around the coupling elements.

The second step is performing N-1 security verification: After determining the preconceived accident set, the N-1 security verification of the IES is performed under different operating conditions, that is, determine the current operating status of the IES, whether the coupling elements in the IES are out of limits, and determine the type of the operating status.

Step 2-1: constructing a preconceived accident set of the IES:

1) The preconceived accident set is set for the breaking of the coupling elements (such as gas turbine, P2G, CHP and gas boiler), the breaking of the coupling elements affect the change of the operating points of two or more subsystems, thereby affecting the operating state of the IES, and a plurality of elements may out of the limit.

2) The preconceived accident set is set for the breaking of the near-end branch of the coupling elements (such as power lines, thermal pipelines, and natural gas pipelines), the quit of the near-end branch of the coupling elements affects the change in the output of the coupling elements, affects the change of the operating point of one or more subsystems, and further a plurality of elements in the IES may out of the limit.

Step 2-2: performing N-1 security verification of the IES to verify that the coupling elements meet the constraints:

by solving the multiple energy flow equations of the IES under different operating conditions, the operating status of the IES is obtained which verifies that the elements of the IES meet the equality constraints. Therefore, the inequality constraints of the IES are mainly verified, that is, to determine whether the branch flow and node voltage of the electric power system, liquid flow of the thermal system, node pressure and pipeline flow of the natural gas system out of the limits. In order to judge whether the elements in the IES are out of limit, it is necessary to preset constraint conditions of the coupling elements, the details of the constraint conditions are as follows:

1) Security Operation Constraints of the Electric Power System

The security operation constraints of the electric power system mainly include: lines thermal stability security operation constraint and voltage security operation constraint.

Wherein the lines thermal stability security operation constraint is:

$$P_{min} \leq P_{ij} \leq P_{max} \quad (19)$$

$$Q_{min} \leq Q_{ij} \leq Q_{max} \quad (20)$$

Where $P_{ij}$ is the active power transmitted from the node i to the node j; $Q_{ij}$ is the reactive power transmitted from the node i to the node j; $P_{min}$ and $P_{max}$ are the minimum and maximum power of the active power transmitted by the lines, respectively; and $Q_{min}$ and $Q_{max}$ are the minimum and maximum active power transmitted by the lines, respectively.

Wherein the lines thermal stability security operation constraint is:

$$U_{min} \leq U_i \leq U_{max} \quad (21)$$

Where $U_i$ is the voltage amplitude of the node i; $U_{min}$ 和 $U_{max}$ are the minimum and maximum values of the node voltage amplitude, respectively.

2) Security Operation Constraints of the Natural Gas System

The security operation constraints of the natural gas system include natural gas pipeline transmission flow security operation constraint, node pressure security operation constraint, and gas source input security operation constraint.

The natural gas pipeline transmission flow security operation constraint is:

$$f_{min} \leq f_{ij} \leq f_{max} \quad (23)$$

Where $f_{ij}$ is the natural gas flow amount transmitted from node i to node j; $f_{min}$ and $f_{max}$ are the minimum and maximum values of the natural gas flow, respectively.

The node pressure security operation constraint is:

$$p_{min} \leq p_i \leq p_{max} \quad (23)$$

Where $p_i$ is the pressure at node i; $p_{min}$ and $p_{max}$ are the minimum and maximum values of the natural gas node pressure, respectively.

The gas source input security operation constraint is:

$$S_{min} \leq S_{source} \leq S_{max} \quad (24)$$

Where $S_{sorce}$ is the gas input amount of the natural gas balancing node, $S_{min}$ and $S_{max}$ are the minimum and maximum values of the natural gas source input amount, respectively.

Due to the gas input amount of the natural gas system satisfies the security operation constraints, the embodiment of the present invention mainly verifies the branch flow and the changes of the node pressure.

3) Security Operation Constraints of the Natural Gas System

The security operation constraint of the natural gas system comprises pipeline liquid flow security operation constraint, node back-water temperature security operation constraint.

The pipeline liquid flow security operation constraint is:

$$m_{min} \leq m_{ij} \leq m_{max} \quad (25)$$

Where $m_{ij}$ is the liquid flow amount in the pipeline from node i to node j; $m_{min}$ and $m_{max}$ are the minimum and maximum values of the pipeline liquid flow amount, respectively.

The node back-water temperature security operation constraint is:

$$T_{s,min} \leq T_{s,i} \geq T_{s,max} \quad (26)$$

$$T_{r,min} \leq T_{r,i} \leq T_{max} \quad (27)$$

Where $T_{s,i}$ is the inlet liquid temperature at node i; $T_{r,i}$ is the back-water temperature at node i; $T_{s,min}$ and $T_{s,max}$ are the minimum and maximum values of the node inlet liquid temperature, respectively; and $T_{r,min}$ and $T_{r,max}$ are the minimum and maximum values of the node back-water temperature, respectively.

Due to the temperature change of the node temperature in the thermal system of the IES is small, and the inlet and back water temperatures meet the security operation constraints, the embodiment of the present invention mainly verifies the changes of the pipeline liquid flow.

Step 3: Performing N-1 Security Verification of the IES: the step analyzes why the coupling elements are out of limit based on the N-1 security verification of the IES, comprising:

Summarizing the N-1 verification results which includes: determining the relationship among the out-of-limit degree of the coupling elements in the IES, the scope of the out-of-limit and the current operating status of the IES; analyzing why the coupling elements are out of limit, comparing the advantages and disadvantages of the security control mode and mutual aid control mode, and identifying the weakness in the system.

The coupling elements quit operation, and the power shortage caused by the balance nodes in the system is increased, which results in multiple branches and pipes of the system exceeding the limit, and at the same time affecting the state of the nodes, the voltage exceeds the limit and the pressure exceeds the limit.

When the near-end branch of the coupling elements quit operation, the IES in two modes are both enter the emergency status with different out-of-limit degrees and affection scopes. The affections to the IES in two modes are as follows: the near-end branch of the coupling elements quits operation, the protection control mode can isolate the disturbance within a certain range; while in the mutual aid control mode, the disturbance may spread to other subsystems through the coupling elements, expanding the affection range of the IES, and strengthening the uncertainty. Comparing the advantages and disadvantages of the two modes, the protection control mode has more obvious advantages. In actual operation, when the load is continuously increased to bring the IES into an alert status, the coupling elements should be adjusted to the protection control mode to keep its operating point unchanged to maximize the protection of IES.

By analyzing N-1 security operation verification of IES, the change of the operating point of the coupling elements often affect the balance among the energy flow of the subsystems, and a variety of complex coupling elements out-of-limit occasions may occur. Wherein, branches e1-e2, e1-e5 of the electric power system, nodes e4 and e5 of the electric power system, pipeline h1-h2 of the thermal system and nodes g9, g10, and g12 of the natural gas system are weakness in the IES. A plurality of disturbances will lead the coupling elements out of the limit, requiring focus on or renewal.

Therefore, according to the embodiment of the present invention, the N-1 static security analysis for the IES can be implemented through the above steps, and meets multiple needs in practical applications.

Embodiment 3

Figure 2:
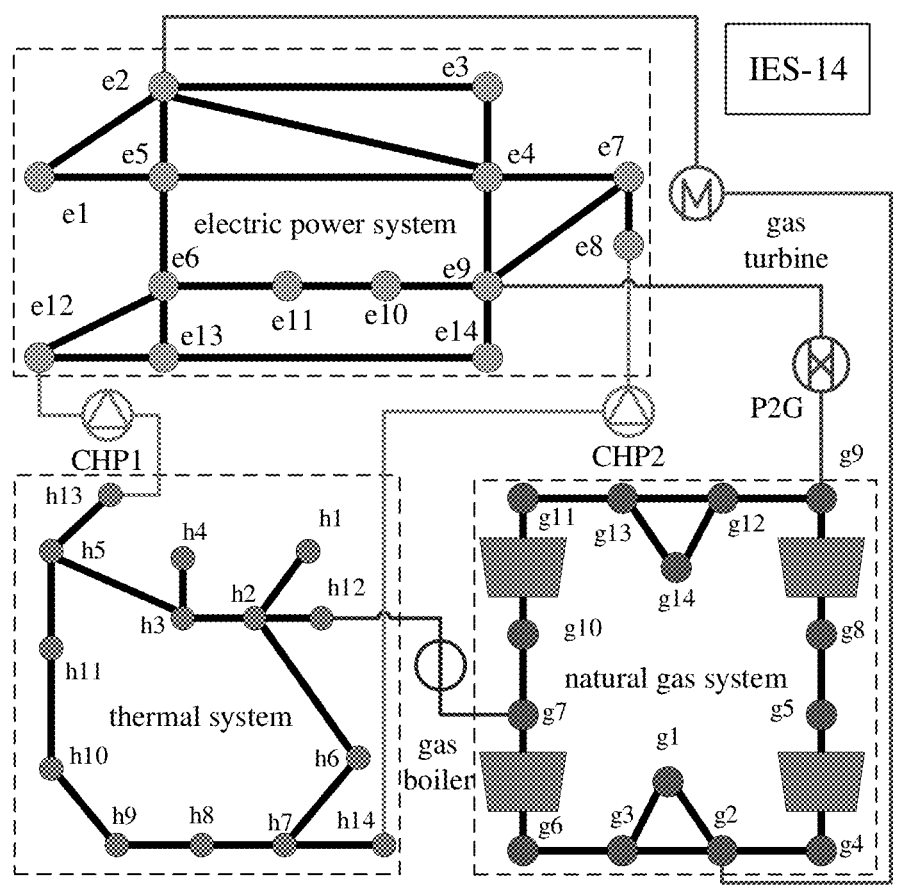
FIG. 2 is a topological diagram of the IES at node 14-14-14 according to the present invention.

This embodiment of the present invention takes the node 14-14-14 of the electro-gas-thermal energy IES as an embodiment to verify the validation of the N-1 static security analysis method, the topology diagram is shown in FIG. 2.

Figure 3:
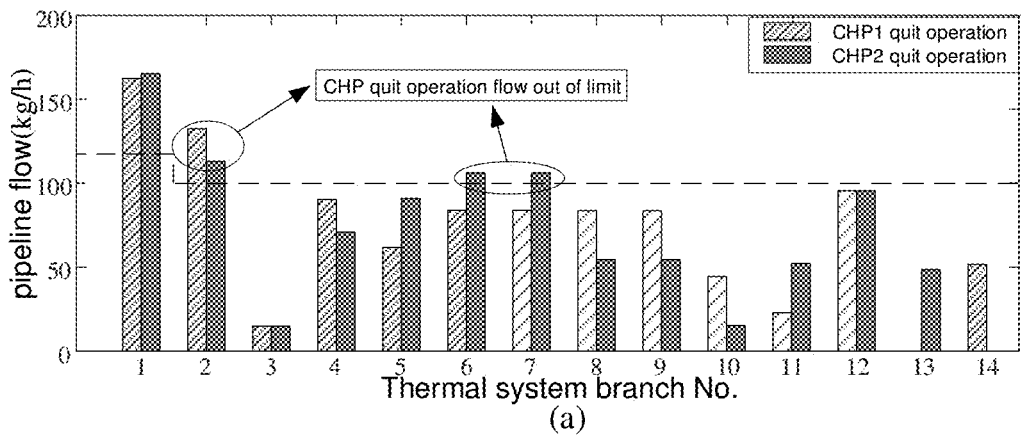
FIG. 3 is a diagram showing the security verification result after the CHP is quit operation.
Figure 3:
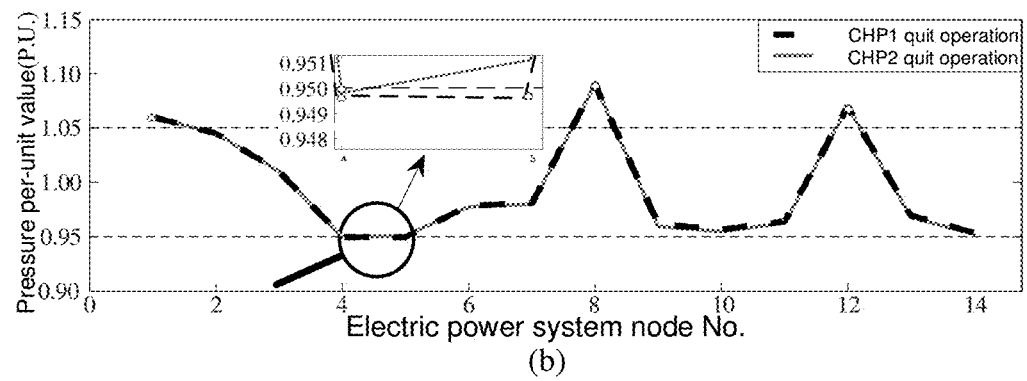
Figure 3:
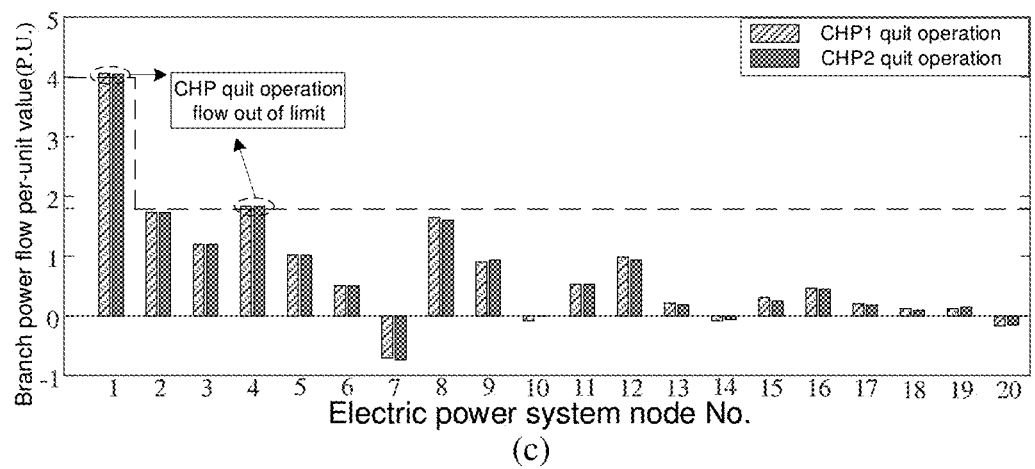

Firstly, the impact on the IES after the coupling elements quit operation is analyzed, the N-1 verification result after the CHP is quit operation is shown in FIG. 3. The quit of CHP makes the node voltage and branch power flow in the electric power system and flow of the thermal system out of the limit.

Figure 4:
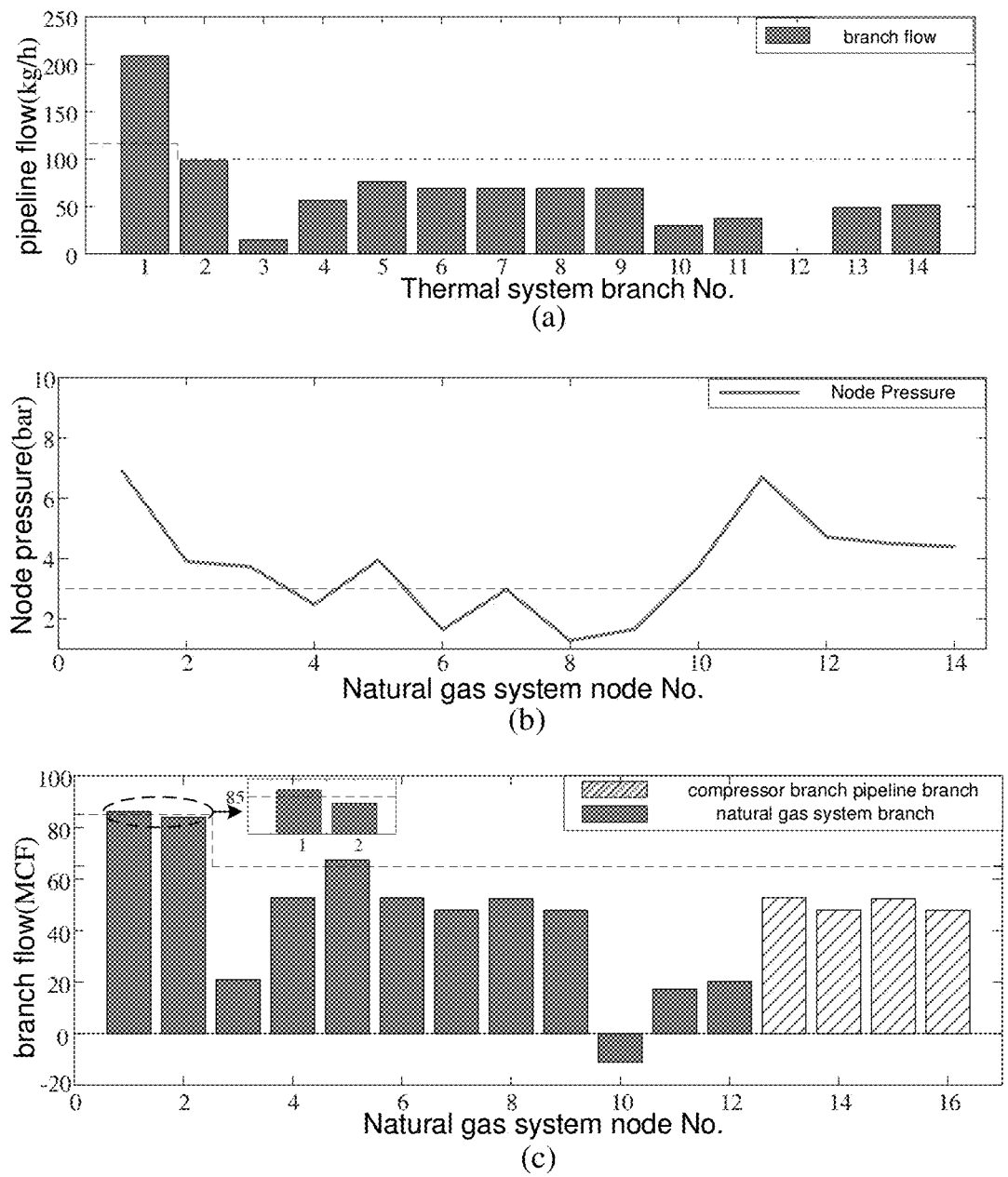
FIG. 4 is a diagram showing the security verification result after the gas boiler and the P2G is quit operation.

Similarly, the quit of gas boiler and P2G also make the coupling elements out of the limit, as shown in FIG. 4.

Figure 5:
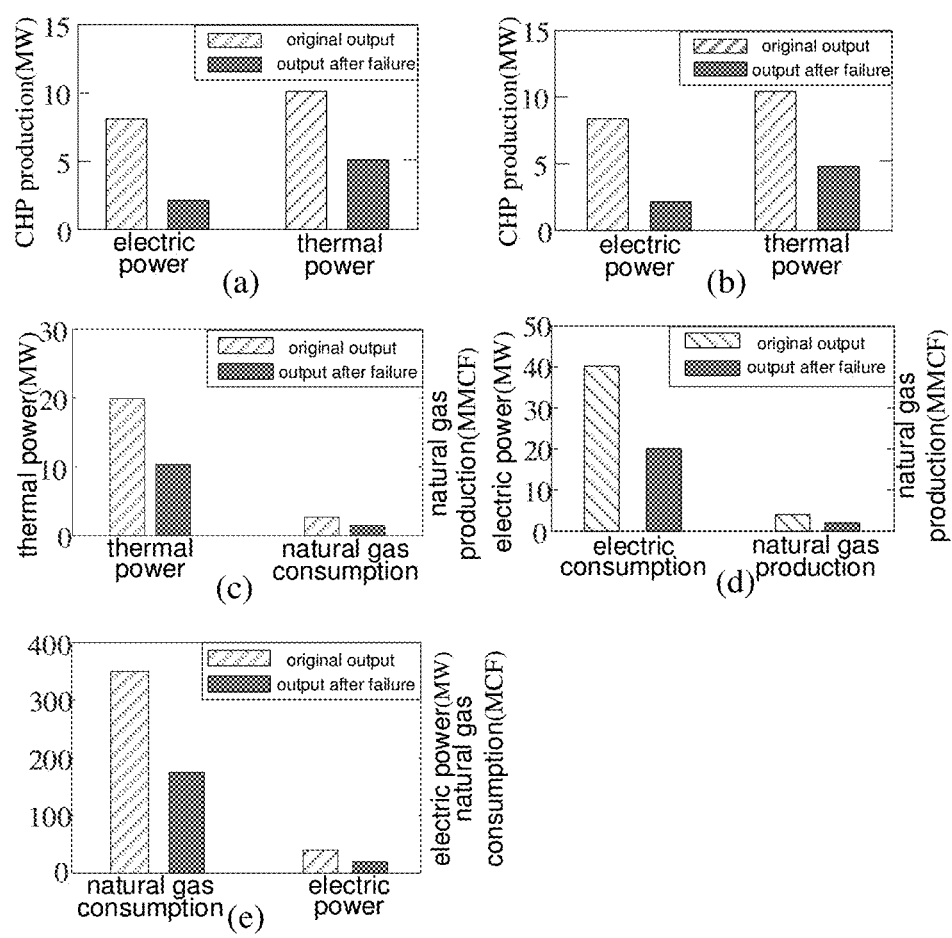
FIG. 5 is a power change diagram after the near-end branch of the coupling elements is quit operation.

Secondly, in order to explain the impact of the security of the IES under different control modes, the initial conditions of different coupling elements, the multiple energy flow equation and output of the coupling elements are shown in FIG. 5.

Finally, by comparing the N-1 verification results of the different control modes in Tab.1 and Tab.2, the conclusion is as follows: when the near-end branch of the coupling elements quits operation, the change of the output of the coupling elements can affect one or more subsystems; when the coupling elements keep the original output, only one subsystem is disturbed; when the coupling elements change the output, multiple subsystems will be affected, and will generate increased disturbance, disturbance shift, etc.

TABLE 1

| No. | Disturbance Type | Affected element | Keeping the original output | Changing the output |
|---|---|---|---|---|
| 1 | Power grid Branch e6-e12 quit operation | CHP1 | Voltage of grid load nodes are out of limit Branches e1-e2(0.18), e1-e5(0.04) power flow out of limit | Voltage of grid load nodes are out of limit Branches e1-e2(0.36), e1-e5(0.1) power flow out of limit Thermal system pipeline h2-h3(17.1 kg/h) flow out of limit |
| 2 | Power grid Branch e12-e13 quit operation | CHP1 | Except for node e7, other load nodes of grid are out of limit Branches e1-e2(0.04), e1-e5(0.01) power flow out of limit | Except for node e7, other load nodes of grid are out of limit Branches e1-e2(0.1), e1-e5(0.03) power flow out of limit Thermal system pipeline h2-h3(17.1 kg/h) flow out of limit |
| 3 | Power grid Branch e6-e11 quit operation | CHP1 | Grid nodes e10(0.01), e11(0.02), e14(0.001) voltage out of limit Branch e1-e5(0.02) power flow out of limit | Grid nodes e10(0.02), e11(0.03), e14(0.002) voltage out of limit Branch e1-e5(0.04) power flow out of limit Thermal system pipeline h2-h3(17.1 kg/h) flow out of limit |

TABLE 1-continued

| No. | Disturbance Type | Affected element | Keeping the original output | Changing the output |
|---|---|---|---|---|
| 4 | Power grid Branch e6-e13 quit operation | CHP1 | Grid nodes e4(0.004), e5(0.001), e10(0.01), e13(0.03), e14(0.03) voltage out of limit Branches e1-e2(0.08), e1-e5(0.04) power flow out of limit | Grid nodes e4(0.01), e5(0.005), e10(0.02), e13(0.03), e14(0.04) voltage out of limit Branch e1-e2(0.2), e1-e5(0.09) power flow out of limit Thermal system pipeline h2-h3(17.1 kg/h) flow out of limit |
| 5 | Power grid Branch e4-e7 quit operation | CHP2 | Except for node e7, other load nodes of grid are out of limit Branches e1-e2(0.09), e1-e5(0.04), e5-e6(0.29) power flow out of limit | Except for node e7, other load nodes of grid are out of limit Branches e1-e2(0.16), e1-e5(0.07), e5-e6(0.29) power flow out of limit Thermal system pipeline h2-h3(6.4 kg/h) flow out of limit |
| 6 | Thermal system Pipeline h10-h11 quit operation | CHP1 | Thermal system pipelines h2-h6(10.6 kg/h), h6-h7(10.6 kg/h), h7-h8(6.7 kg/h), h8-h9(6.7 kg/h) flow out of limit | Thermal system pipelines h2-h6(10.6 kg/h), h6-h7(10.6 kg/h), h7-h8(6.7 kg/h), h8-h9(6.7 kg/h) flow out of limit Grid nodes e4(0.1) and e5(0.1)voltage out of limit Branches e1-e2(0.048), e1-e5(0.029) power flow out of limit |
| 7 | Thermal system Pipeline h3-h5 quit operation | CHP1 | Thermal system pipelines h2-h6(30.26 kg/h), h6-h7(30.26 kg/h), h7-h8(26.4 kg/h), h8-h9(26.4 kg/h) flow out of limit Pipeline h11-h10 reverse operation | Thermal system pipelines h2-h6(54.5 kg/h), h6-h7(54.5 kg/h), h7-h8(50.7 kg/h), h8-h9(50.7 kg/h) flow out of limit Pipeline h11-h10 reverse operation Grid nodes e4(0.1), e5(0.1) voltage out of limit Branches e1-e2(0.048), e1-e5(0.029) power flow out of limit |
| 8 | Thermal system Pipeline h5-h11 quit operation | CHP1 | Thermal system pipelines h2-h6(40.5 kg/h), h6-h7(40.5 kg/h), h7-h8(37.0 kg/h), h8-h9(37.0 kg/h) flow out of limit Pipeline h11-h10 reverse operation | Thermal system pipelines h2-h6(45.5 kg/h), h6-h7(45.5 kg/h), h7-h8(42.0 kg/h), h8-h9(42.0 kg/h) flow out of limit pipeline h11-h10 reverse operation Grid nodes e4(0.1), e5(0.1) voltage out of limit Branches e1-e2(0.048), e1-e5(0.029) power flow out of limit |
| 9 | Thermal system Pipeline h8-h9 quit operation | CHP2 | Thermal system pipelines h2-h6(60.2 kg/h), h3-h5(20.1 kg/h), h5-h11(40.2 kg/h), h9-h10(6.4 kg/h) flow out of limit | Thermal system pipelines h2-h6(67.2 kg/h), h3-h5(25.1 kg/h), h5-h11(45.2 kg/h), h9-h10(6.4 kg/h) flow out of limit Grid node e4(0.1) voltage out of limit Branches e1-e2(0.058), e1-e5(0.036) power flow out of limit |
| 10 | Thermal system Pipeline h9-h10 quit operation | CHP2 | Thermal system pipelines h2-h3(29.3 kg/h), h5-h11(6.3 kg/h) flow out of limit | Thermal system pipelines h2-h3(53.3 kg/h), h5-h11(6.3 kg/h) flow out of limit Grid node e4(0.1) voltage out of limit Branches e1-e2(0.058), e1-e5(0.036) power flow out of limit |

TABLE 2

| Disturbance No. | Type | Affected element | Security condition of protection control mode | Security condition of mutual aid control mode |
|---|---|---|---|---|
| 1 | Natural gas system Compressor branch g10-g11 quit operation | Gas boiler | Node g13 (2.39bar) Pressure out of limit | Node g9(0.46bar) Pressure out of limit Pipeline h1-h2(16.2 kg/h) flow out of limit |
| 2 | Natural gas system Compressor branch g6-g7 quit operation | Gas boiler | Nodes g9(0.47bar), g10(2.07bar), g11(1.33bar) Pressure out of limit | Nodes g10(0.77bar), g13(2.27bar) Pressure out of limit Pipeline h1-h2(16.2 kg/h) flow out of limit |
| 3 | Power grid Branch e4-e9 quit operation | P2G | Grid nodes e4(0.007), e5(0.009), e10(0.003), e14(0.003) Voltage out of limit | Grid nodes g6(1.52bar), g10(0.3bar), g12(2.34bar), g13(1.17bar), g14(1.3bar) Voltage out of limit |
| 4 | Power grid Branch e9-e14 quit operation | P2G | Grid node e14(0.005) Voltage out of limit Branch e1-e5(0.012) Power flow out of limit | Grid node e14(0.001) Voltage out of limit Nodes g6(1.52bar), g10(0.31bar), g12(2.34bar), g13(1.17bar), g14(1.3bar) Pressure out of limit |
| 5 | Power grid Branch e9-e10 quit operation | P2G | Grid nodes e10(0.002), e11(0.001) Voltage out of limit Branch e1-e5(0.01) Power flow out of limit | Nodes g6(1.52bar), g10(0.31bar), g12(2.34bar), g13(1.17bar), g14(1.3bar) Pressure out of limit |
| 6 | Natural gas system Compressor branch g8-g9 quit operation | P2G | Nodes g12(1.54bar), g14(1.83bar) Pressure out of limit | Nodes g6(1.13bar), g10(0.38bar), g13(1.53bar), g14(0.08bar) Pressure out of limit |
| 7 | Natural gas system Compressor branch g4-g5 quit operation | Gas turbine | Nodes g8(2bar), g9(1.53bar), g10(0.3bar), g13(0.44bar) Pressure out of limit | Nodes g8(1.2bar), g9(0.42bar) Pressure out of limit Branches e1-e2(0.164), e1-e5(0.346) Power flow out of limit |
| 8 | Power grid Branch e2-e3 quit operation | Gas turbine | Grid nodes g4(0.015), g5(0.017) Voltage out of limit Branches e1-e5(0.41) Power flow out of limit | Grid nodes g4(0.015), g5(0.017) Voltage out of limit e2-e4(0.21), Branches e2-e4(0.25), e1-e5(0.45) Power flow out of limit |
| 9 | Power grid Branch e2-e4 quit operation | Gas turbine | Grid nodes g4(0.03), g5(0.03), g10(0.006), g14(0.007) Voltage out of limit Branches e1-e2(0.24), e2-e3(0.75), e1-e5(0.44) power flow out of limit | Grid nodes g4(0.03), g5(0.03), g9(0.001), g10(0.007), g14(0.008) Voltage out of limit Branches e1-e2(0.433), e2-e3(0.75), e1-e5(0.47) power flow out of limit |

In conclusion, the method provided in the embodiments of the present invention performs N-1 static security analysis in the IES considering the change of the output of the coupling elements.

Unless the model numbers of devices are specified in the embodiments of the present invention, the model numbers of other devices are not limited as long as the above functions can be realized.

Those skilled in the art should understand that the accompanying drawings are schematic diagrams of a preferred embodiment, and the serial numbers of the embodiments of the present invention are merely descriptive and do not indicate the priority of the embodiments.

The forgoing description merely shows preferred embodiments of the present invention and is not intended to limit the present invention. Any modification, equivalent replacement and improvement without departing from the spirit and principle of the present invention shall fall into the protection scope of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An N-1 static security analysis method for integrated energy system (IES), including the following steps:
constructing a static model of the IES including electro-gas-thermal coupling elements, calculating a multiple energy flow using equations, and calculating the multiple energy flow of the IES according to a decoupling algorithm, so that an operating status of the IES is obtained;

constructing an N-1 preconceived accident set based on the obtained operating status of the IES, calculating the multiple energy flow of the IES in the preconceived accident set, and performing security verification to the status of the coupling elements in each preconceived accident set, respectively; and analyzing the security verification results by comparing the results of static security analysis under different control modes, so that an N-1 static security analysis of the IES is achieved.

2. The N-1 static security analysis method according to claim 1, wherein the mathematical model of the coupling elements in the static modeling of the IES includes a combined heat and power (CHP) unit mathematical model, a power to gas(P2G) model, a gas boiler model and a gas turbine model.

3. The N-1 static security analysis method according to claim 1, wherein the P2G model is as follows:

$$G_{P2G,m} = \frac{\beta \cdot P_{P2G,n}}{H_g}$$

$$0 \leq P_{P2G,n} \leq P_{N,P2G}$$

where $G_{P2G,m}$ is the natural gas consumption value at node m of the natural gas system; $H_g$ is the natural gas high calorific value; $P_{p2G,n}$ is the power consumed by P2G at node n of the electric power system, $\beta$ is the efficiency of the P2G, $P_{N,P2G}$ is the rated efficiency of the P2G.

4. The N-1 static security analysis method according to claim 1, wherein the gas boiler model is as follows:

$$P_{MT,r} = \alpha \cdot H_g \cdot l_{MTJ}$$

$$0 \leq P_{MT,r} \leq P_{N,MT}$$

where $I_{MT,I}$ is the natural gas consumption value at node 1 of the natural gas system; $P_{MT,r}$ is the thermal power input at node r of the thermal system, $\alpha$ is the efficiency of the gas boiler; $H_g$ is the natural gas high calorific value; $P_{N,MT}$ is the rated efficiency of the gas boiler.

5. The N-1 static security analysis method according to claim 1, wherein the gas turbine model is as follows:

$$P_{GD,t} = \gamma \cdot H_g \cdot l_{GD,u}$$

$$0 \leq P_{GD,u} \leq P_{N,GD}$$

where $I_{GD,u}$ is the natural gas consumption value at node u of the natural gas system; $P_{GD,t}$ is the power input at node t of the electric power system, $\gamma$ is the efficiency of the gas turbine; $H_g$ is the natural gas high calorific value; $P_{N,GD}$ is the rated efficiency of the gas turbine.

6. The N-1 static security analysis method according to claim 1, wherein the step of constructing the N-1 preconceived accident set based on the obtained operating status of the IES includes:

selecting the coupling elements as the key point of the IES, expanding the preconceived accident set around the coupling elements.

7. The N-1 static security analysis method according to claim 1, wherein the step of performing security verification to the status of the coupling elements in each preconceived accident set, respectively includes:

performing N-1 verification to the IES under different operating conditions, obtaining the current operating status of the IES, determining whether the coupling elements in the IES are out of limits, and determining the type of the operating status.

8. The N-1 static security analysis method according to claim 7, wherein the step of determining whether the coupling elements in the IES are out of limits-includes:

determining whether the following values are out of limits: branch power flow and node voltage of electric power system, fluid flow of the thermal system, node pressure and pipeline flow of the natural gas system.

* * * * *